United States Patent
Liu et al.

(10) Patent No.: US 12,374,098 B2
(45) Date of Patent: Jul. 29, 2025

(54) ENCODING OF TRAINING DATA FOR TRAINING OF A NEURAL NETWORK

(71) Applicant: Axis AB, Lund (SE)

(72) Inventors: Haochen Liu, Lund (SE); Jiandan Chen, Lund (SE)

(73) Assignee: AXIS AB, Lund (SE)

(*) Notice: Subject to any disclaimer, the term of this patent is extended or adjusted under 35 U.S.C. 154(b) by 339 days.

(21) Appl. No.: 18/301,543

(22) Filed: Apr. 17, 2023

(65) Prior Publication Data

US 2023/0343082 A1    Oct. 26, 2023

(30) Foreign Application Priority Data

Apr. 20, 2022 (EP) .................................... 22169005

(51) Int. Cl.
*G06V 10/82* (2022.01)
*G06V 10/764* (2022.01)
*G06V 10/774* (2022.01)

(52) U.S. Cl.
CPC ............ *G06V 10/82* (2022.01); *G06V 10/764* (2022.01); *G06V 10/774* (2022.01)

(58) Field of Classification Search
CPC .... G06V 10/82; G06V 10/764; G06V 10/774; G06V 10/25; G06V 10/454; G06V 10/255; G06V 10/772; G06V 10/7753; G06V 10/776; G06V 10/7788; G06V 20/20; G06V 20/52; G06V 20/56; G06N 3/045; G06N 3/08; G06N 3/084; G06N 3/048;

(Continued)

(56) References Cited

U.S. PATENT DOCUMENTS 10,319,115 B2 *  6/2019  Park ....................... G06N 3/045
10,504,027 B1 * 12/2019  Kim ........................ G06N 3/09
(Continued)

FOREIGN PATENT DOCUMENTS

WO    2022/011233 A1    1/2022

OTHER PUBLICATIONS

Zhao et al. "Towards A Category-extended Object Detector without Relabeling or Conflicts." (2021).
(Continued)

*Primary Examiner* — Michael S Osinski
(74) *Attorney, Agent, or Firm* — Volpe Koenig

(57) ABSTRACT

A method for encoding training data for training of a neural network comprises: obtaining training data including multiple datasets, each dataset comprises images annotated with at least one respective object class, forming, each dataset having an individual background class associated with the object class; encoding the images of the datasets to be associated with their respective individual background class; encoding image patches belonging to annotated object classes to be associated with their respective object class; encoding each of the datasets, to include an ignore attribute ("ignore") to object classes that are annotated only in the other datasets and to background classes formed for the other datasets of the multiple datasets, the ignore attribute indicating that the assigned object class and background classes do not contribute in adapting the neural network in training using the respective dataset; and providing the encoded training data for training of a neural network.

15 Claims, 8 Drawing Sheets

(58) Field of Classification Search
CPC ............ G06N 7/01; G06N 20/20; G06N 3/04;
G06N 3/044; G06N 3/0464; G06N 3/088;
G06N 3/09; G06T 2207/20081; G06T
2207/20084; G06T 7/11; G06T 7/194;
G06T 11/60; G06T 7/0012; G06T 7/246;
G06T 7/73; G06F 18/214; G06F 18/2431;
G06F 16/583; G06F 16/5854; G06F
18/2113; G06F 18/217
See application file for complete search history.

(56) References Cited

U.S. PATENT DOCUMENTS

| | | | |
|---|---|---|---|
| 10,769,198 B1* | 9/2020 | Tsai | G06Q 30/0625 |
| 11,222,238 B2 | 1/2022 | Schulter et al. | |
| 11,521,010 B2* | 12/2022 | Caesar | G06F 18/2113 |
| 11,610,115 B2* | 3/2023 | Kar | G06N 3/045 |
| 12,087,042 B2* | 9/2024 | Shen | G06N 3/08 |
| 12,260,335 B2* | 3/2025 | Dwivedi | G06N 3/08 |
| 2017/0344884 A1* | 11/2017 | Lin | G06N 3/048 |
| 2019/0188525 A1* | 6/2019 | Choi | G06N 3/045 |
| 2019/0258901 A1* | 8/2019 | Albright | G06N 3/084 |
| 2020/0160087 A1* | 5/2020 | Redmon | G06V 10/82 |
| 2020/0242736 A1* | 7/2020 | Liu | G06T 3/60 |
| 2020/0302230 A1* | 9/2020 | Chang | G06F 18/214 |
| 2020/0334501 A1* | 10/2020 | Lin | G06F 18/214 |
| 2020/0342593 A1* | 10/2020 | Honjo | A61B 8/5207 |
| 2020/0349464 A1* | 11/2020 | Lin | G06N 3/084 |
| 2021/0150275 A1 | 5/2021 | Schulter et al. | |
| 2022/0044125 A1* | 2/2022 | Rangu | G06N 3/088 |
| 2022/0076117 A1* | 3/2022 | Amon | G06T 7/70 |
| 2022/0148189 A1* | 5/2022 | Tsai | G06V 10/82 |
| 2022/0237789 A1* | 7/2022 | Nie | G06F 18/2414 |
| 2022/0327711 A1* | 10/2022 | Wang | G06T 7/143 |
| 2023/0230257 A1* | 7/2023 | Fay | G06T 7/60 382/103 |
| 2023/0334814 A1* | 10/2023 | Ranganathan | G06N 3/0895 |
| 2023/0360271 A1* | 11/2023 | Jindal | G06T 7/73 |
| 2023/0396817 A1* | 12/2023 | Mittal | G06V 20/46 |
| 2024/0037750 A1* | 2/2024 | Hwang | G06T 7/11 |
| 2024/0144729 A1* | 5/2024 | Septiana | G06N 3/09 |
| 2024/0378728 A1* | 11/2024 | Chung | G06T 7/194 |

OTHER PUBLICATIONS

Extended European Search Report dated Sep. 22, 2022 for European Patent Application No. 22169005.0.
Zhao et al., "Learning a unified label space," (2020).
Zhao et al., "Object Detection with a Unified Label Space from Multiple Datasets," (2020).

* cited by examiner

ENCODING OF TRAINING DATA FOR TRAINING OF A NEURAL NETWORK

FIELD OF INVENTION

The present disclosure generally relates to the field of camera surveillance, and in particular to a method and control unit for encoding training data for training of a neural network for detecting and classifying objects.

TECHNICAL BACKGROUND

Neural networks have proven to be efficient in detecting and classifying objects in images and video streams. The accuracy in classifying objects depends largely on the underlying training of the neural network which is performed using suitable training data that preferably closely resembles the intended use case.

The training data should represent different object classes, where an object class relates to a class or type of object that is targeted by the neural network.

Generally, a neural network is represented by its architecture that shows how to transform from inputs to outputs. The neural network consists of multiple node layers. The nodes are connected and have been associated with weights and thresholds which are learned from training to produce a neural network model.

The training data may include multiple datasets where object data samples in a dataset is annotated according to the class that the object data sample belongs to. Other samples of the dataset are traditionally considered background or so-called negative samples.

When a neural network is trained from multiple datasets, it may occur that the negative samples in one dataset contain data samples that would be annotated and thus considered positive samples in other datasets of the training data. Stated otherwise, a sample considered positive in one dataset may be misused as background in another dataset. This will lead to reduced performance for the neural network in detecting objects related to the annotated object data samples.

Accordingly, there is room for improvements with regards to training of neural networks.

SUMMARY

In view of above-mentioned and other drawbacks of the prior art, it is an object of the present disclosure to provide an improved method for encoding training data for training of a neural network that alleviates at least some of the drawbacks of prior art. More specifically, it would be advantageous to provide a method for encoding training data to improve the training of a neural network when using multiple datasets.

According to a first aspect, it is therefore provided a method for encoding training data for training of a neural network.

The method comprises obtaining training data including multiple datasets where each dataset comprises images annotated with at least one respective object class and where a number of background classes is less than the number of datasets, forming, for each of the multiple datasets, an individual background class associated with the at least one respective object class annotated in each of the multiple datasets; encoding the images of the multiple datasets to be associated with their respective individual background class; encoding image patches belonging to annotated object classes in the images of the multiple datasets to be associated with their respective object class; encoding each of the multiple datasets, to include an ignore attribute to object classes that are annotated only in the other datasets of the multiple datasets and to background classes formed for the other datasets of the multiple datasets, the ignore attribute indicating that the assigned object class and background classes do not contribute in adapting the neural network in training using the respective dataset; providing the encoded training data for training of a neural network.

Introducing multiple background classes in the encoding of the training data is advantageous. More specifically, one background class is introduced for each respective dataset. By introducing individual background classes for the datasets, misusing image patches as negative or background in training when they are including object data samples that would be considered positive in another dataset can be avoided.

It was further realized to encode the datasets with assigned ignore attributes to object classes in a one dataset that are annotated in any one of the other datasets but not the one dataset, and in a similar way to provide an ignore attribute to background classes formed for another dataset but not for the one dataset. In this way, it can further be ensured that data samples are not misused in the training.

By the provision of embodiments herein, the proposed encoding provides for improved use of multiple datasets annotated with different object classes for training of a neural network. In particular, the performance of the neural network model is improved in terms of detection accuracy by training using training data encoded by the herein disclosed method. Further, embodiments disclosed herein provide for reducing the workload and time for preparing annotations because every obtained data set does not need to have annotations for every class.

An example encoding that may be used for embodiments disclosed herein is one-hot encoding known per se in the art.

In most cases, the number of background classes annotated in the obtained training data is one.

Providing the encoded training data for training of a neural network may include using the encoded training data for training of the neural network. The encoded training data may be only temporarily stored in a memory device during training and is discarded after training is complete. In some possible implementations, the encoded training data is generated on the fly and is discarded once the training is complete.

The obtained training data used as input training data in the initial step of the encoding method may be considered encoded according to a first encoding. The first encoding includes that the images of each dataset are annotated with at least one object class and that one background class is provided by the datasets. The proposed encoding method may be considered to obtain the encoded input training data, and re-encode the input training data, and provided a re-encoded training data including a respective background class for each dataset and the ignore attributes.

It can be considered that the result of training a neural network is a neural network model. The neural network model is thus trained for a specific task. Herein the specific task comprises object detection and classification.

A dataset is provided in the form of multiple images in which at least one object sample is annotated. An object sample is defined by its annotations of object class and location in an indexed image. Consequently, the neural network is trained to predict the class and location of an object in an image. Other possible annotations are for example shape, so called polygonal segmentation, and semantic segmentation, and the center coordinate of an object.

The obtained datasets are preferably annotated with different sets of object classes. More precisely, at least one object class that is annotated in one dataset is not annotated in another dataset of the training data.

Annotated samples may be manually annotated or auto annotated using a model or algorithm. An example of a model is an object detection model, a so-called object detector, detecting objects in an image. A further example of a model is a neural network model or a machine learning algorithm.

An object sample that is ignored may be masked in the training images. A masked object sample may for example be pixelated or subject to bounding box masking. However, more generally, an ignored object sample is not selected and therefore not used, or not included, for training of the neural network. Stated otherwise, an ignored sample is excluded for training of the neural network.

Generally, neural networks comprise multiple node layers where the nodes are connected and have been associated with weights and thresholds. The weights and thresholds are learned from training to produce a neural network model. The ignore attribute is configured to cause weights of the neural network to be maintained, i.e., not be adjusted, for samples belonging to object classes or background classes with the ignore attribute in a dataset.

In one embodiment, a single respective individual background class is formed for each of the multiple datasets. This may be included as encoding the images of each of the multiple datasets to be associated with a single respective background class. Preferably, forming the background classes results in that the number of individual background classes is equal to the number of datasets.

In one embodiment, encoding the images may comprise assigning the individual background classes to images patches of the respective ones of the multiple datasets. A background class refers to image patches not associated with the annotated object sample in a dataset. Stated in another way, image patches that do not include an annotated object sample are considered background and therefore is associated with the background class of that dataset.

Further, the ignore attributes may be assigned to images patches of the images of the datasets including samples belonging to object classes or background classes to be ignored.

In one embodiment, the method may comprise forming, for each of the multiple datasets, further object classes that are not annotated in the respective dataset but that are annotated in at least one of the other datasets. Hereby, the datasets are associated also with one or more object class even if the dataset has no object data samples annotated with that one or more object class. This advantageously reduces the risk of misusing object samples incorrectly. Especially if the encoding comprises providing an ignore attribute to the further object classes.

In some possible implementations, a further dataset may be added to the multiple datasets. In related embodiments, the method may comprise receiving a further dataset comprising images annotated with at least one additional object class; forming, for each of the multiple datasets, an additional background class associated with the additional object class annotated in the further dataset; encoding image patches belonging to annotated object classes in the images of the multiple datasets and the further data set to be associated with their respective object class; and encoding the further dataset to include an ignore attribute to object classes that are annotated only in the other ones of the multiple datasets and to background classes associated with the other ones of the multiple datasets. Thus, the method advantageously allows for a straight-forward way to include further datasets in the training data and encode the entire training data with associated background classes and ignore attributes according to the newly added dataset.

Once the training data is encoded according to the embodiments described herein, the encoding serves as ground truth in training of a neural network to detect objects in an image or stream of images.

Accordingly, there is further provided a method for object detection in an image frame. The method comprises training an object detector on the encoded training data with the object classes, background classes, and ignore attributes according to any one of the herein described embodiments as ground truth, receiving an input image, and detecting an object in the input image using the trained object detector. The encoded training data especially allows for training the object detector on the multiple datasets of the encoded training data simultaneously.

Different types of neural networks are conceivable and within the scope of the claims. However, in one preferred embodiment, the neural network is a Convolutional Neural Network (CNN).

According to a second aspect, there is provided a control unit configured to perform or execute the steps according to any one of the herein described embodiments. The control unit is for example configured to obtain training data including multiple datasets, where each dataset comprises images annotated with at least one respective object class, and where a number of background classes is less than the number of datasets, form, for each of the multiple datasets, an individual background class associated with the at least one respective object class annotated in each of the multiple datasets; encode the images of the multiple datasets to be associated with their respective individual background class; encode image patches belonging to annotated object classes in the images of the multiple datasets to be associated with their respective object class; encode each of the multiple datasets, to include an ignore attribute to object classes that are annotated only in the other datasets of the multiple datasets and to background classes formed for the other datasets of the multiple datasets, the ignore attribute indicating that the assigned object class and background classes do not contribute in adapting the neural network in training using the respective dataset; and provide the encoded training data for training of the neural network.

Further embodiments of, and effects obtained through this second aspect are largely analogous to those described above for the first and second aspects.

According to a third aspect, there is provided a system comprising an image capturing device configured to capture a video stream comprising a set of images of a scene, and a control unit according to the second aspect.

The image capturing device may be a camera, such as a surveillance camera.

Further embodiments of, and effects obtained through this third aspect are largely analogous to those described above for the first and second aspects.

According to a fourth aspect, there is provided computer program comprising instructions which, when the program is executed by a computer, cause the computer to carry out the method of any of the herein discussed embodiments. More specifically, the instructions may comprise code for obtaining training data including multiple datasets where each dataset comprises images annotated with at least one respective object class and where a number of background classes is less than the number of datasets, code for forming, for each of the multiple datasets, an individual background class associated with the at least one respective object class annotated in each of the multiple datasets; code for encoding the images of the multiple datasets to be associated with their respective individual background class; code for encoding image patches belonging to annotated object classes in the images of the multiple datasets to be associated with their respective object class; code for encoding each of the multiple datasets, to include an ignore attribute to object classes that are annotated only in the other datasets of the multiple datasets and to background classes formed for the other datasets of the multiple datasets, the ignore attribute indicating that the assigned object class and background classes do not contribute in adapting the neural network in training using the respective dataset; and code for storing the encoded training data in a memory storage device.

Further embodiments of, and effects obtained through this fourth aspect are largely analogous to those described above for the other aspects.

A computer program product is further provided including a computer readable storage medium storing the computer program. The computer readable storage medium may for example be non-transitory, and be provided as e.g., a hard disk drive (HDD), solid state drive (SDD), USB flash drive, SD card, CD/DVD, and/or as any other storage medium capable of non-transitory storage of data.

Further features of, and advantages with, the present disclosure will become apparent when studying the appended claims and the following description. The skilled addressee realize that different features of the present disclosure may be combined to create embodiments other than those described in the following, without departing from the scope of the present claims.

BRIEF DESCRIPTION OF THE DRAWINGS

The various aspects, including its particular features and advantages, will be readily understood from the following detailed description and the accompanying drawings, in which.

DETAILED DESCRIPTION

Figure 1:
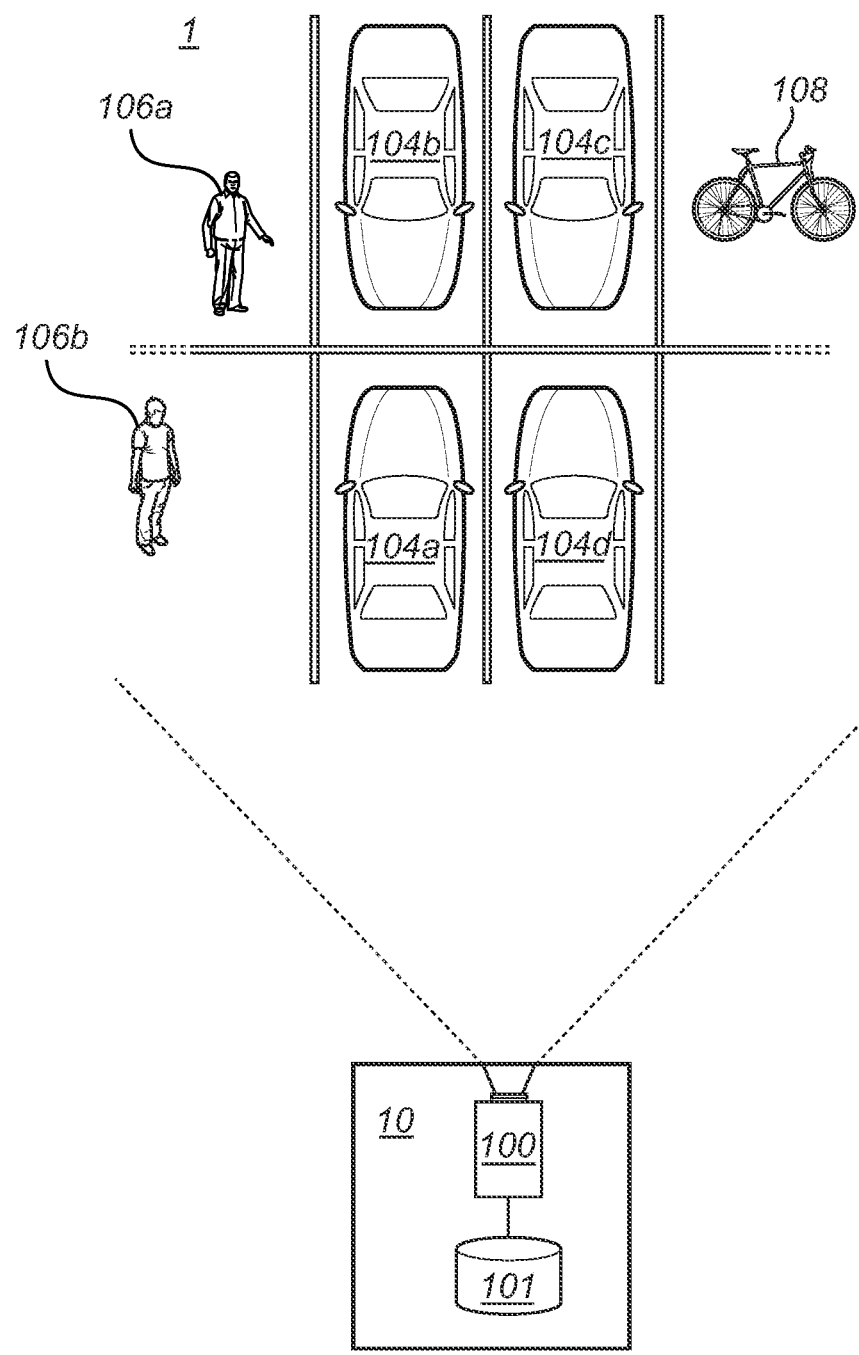
FIG. 1 conceptually illustrates a scene being monitored by an image capturing device as an example application of embodiments.

The present concepts will now be described more fully hereinafter with reference to the accompanying drawings, in which currently preferred embodiments are shown. The embodiments may, however, be embodied in many different forms and should not be construed as limited to the embodiments set forth herein; rather, these embodiments are provided for thoroughness and completeness, and fully convey the scope of the claims to the skilled person. Like reference characters refer to like elements throughout.

Turning now to the drawings and to FIG. 1 in particular, there is shown a scene 1 being monitored by an image capturing device 100, e.g., a camera or more specifically a surveillance camera. In the scene 1, there is a set of objects 104a, 104b, 104c, and 104d, here exemplified as vehicles, and objects 106a and 106b exemplified as people, and object 108 exemplified as a bike. The scene 1 is here a parking lot shown to exemplify a possible implementation.

The camera 100 is continuously monitoring the scene 1 by capturing a video stream or images of the scene 1 and the objects 104a-d, 106a-b, and 108 therein. The camera 100 and a control unit 101 are part of a system 10, where the control unit 101 may either be a separate stand-alone control unit or be part of the camera 100. It is also conceivable that the control unit 101 is remotely located such as on a server and thus operates as a Cloud-based service.

The control unit 101 is configured to operate a neural network model for detecting objects 104a-d, 106a-b, and 108 in the scene 1. For the neural network model to accurately be able to detect objects in the scene 1 and classify them to be of a specific type, e.g., a vehicle, a person, bike, etc., it is necessary that the neural network model has been trained for such detection on training data that represent each of a set of object classes.

Figure 2A:
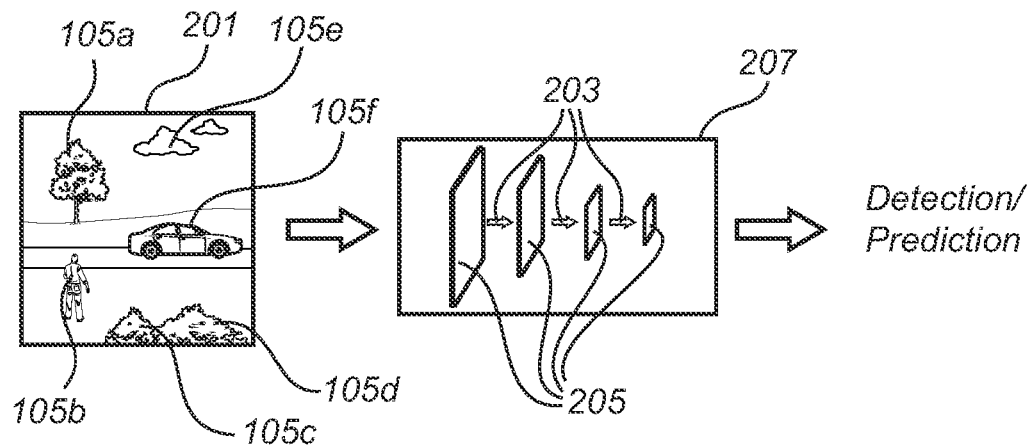
FIG. 2A conceptually illustrates an overview of neural network model prediction according to embodiments.

FIG. 2A conceptually illustrates an overview of neural network prediction process. An image 201 acquired by a camera is input into a neural network model 207, here exemplified as a convolutional neural network, CNN, model. The image 201 includes image data indicative of a objects 105a-f belonging to different object classes, e.g., a vehicle 105f, a plant 105c-d, a cloud 105e, a tree 105a, and a person 105b.

The operation of neural networks is considered known to the skilled person and will not be described in detail.

Generally, for a CNN model, convolutions of the input are used to compute the output. Connections 203 are formed such that parts of an input layer are connected to a node in the output. In each layer 205 of a convolutional neural network, filters or kernels are applied whereby parameters or weights of the filters or kernels are learned during training of the convolutional neural network.

Based on its training, the neural network model 207 provides a prediction of the objects detected in the image and their corresponding class.

Figure 2B:
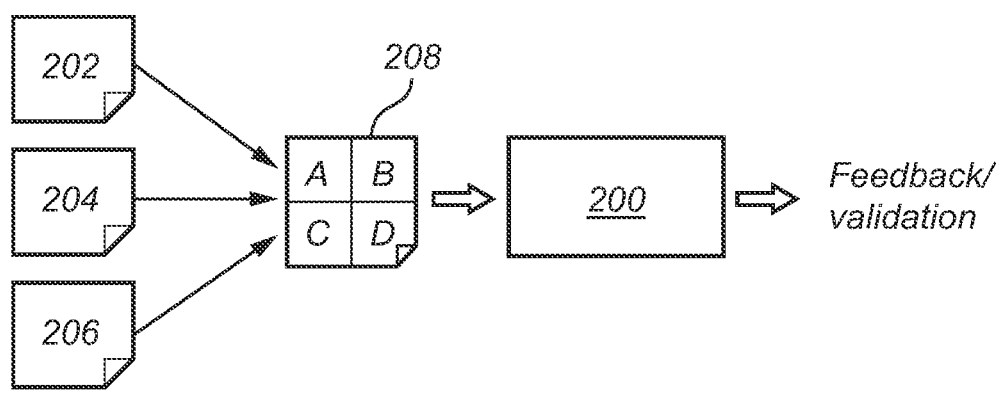
FIG. 2B conceptually illustrates an overview of neural network training according to embodiments.

FIG. 2B conceptually illustrates an overview of neural network training. Here multiple datasets 202, 204, and 206 have been obtained where each dataset comprises images having patches annotated with at least one respective object class, here object classes A, B, C, and D are included. The images annotated with the different classes A, B, C, and D are provided to the neural network 200 which feeds back on its predictions and performs validation steps, or training steps, to improve its predictions. More specifically, the neural network 200 backpropagates on its gradient of a loss function to improve model accuracy performance.

As discussed above, the training data includes multiple datasets 202, 204, and 206 with annotated object classes corresponding to the different object types targeted for the neural network model to classify. In order to take full advantage of training on multiple datasets, proposed herein is a method for encoding the training data so that each dataset is associated with a respective background class as is described in more detail herein.

Figure 3:
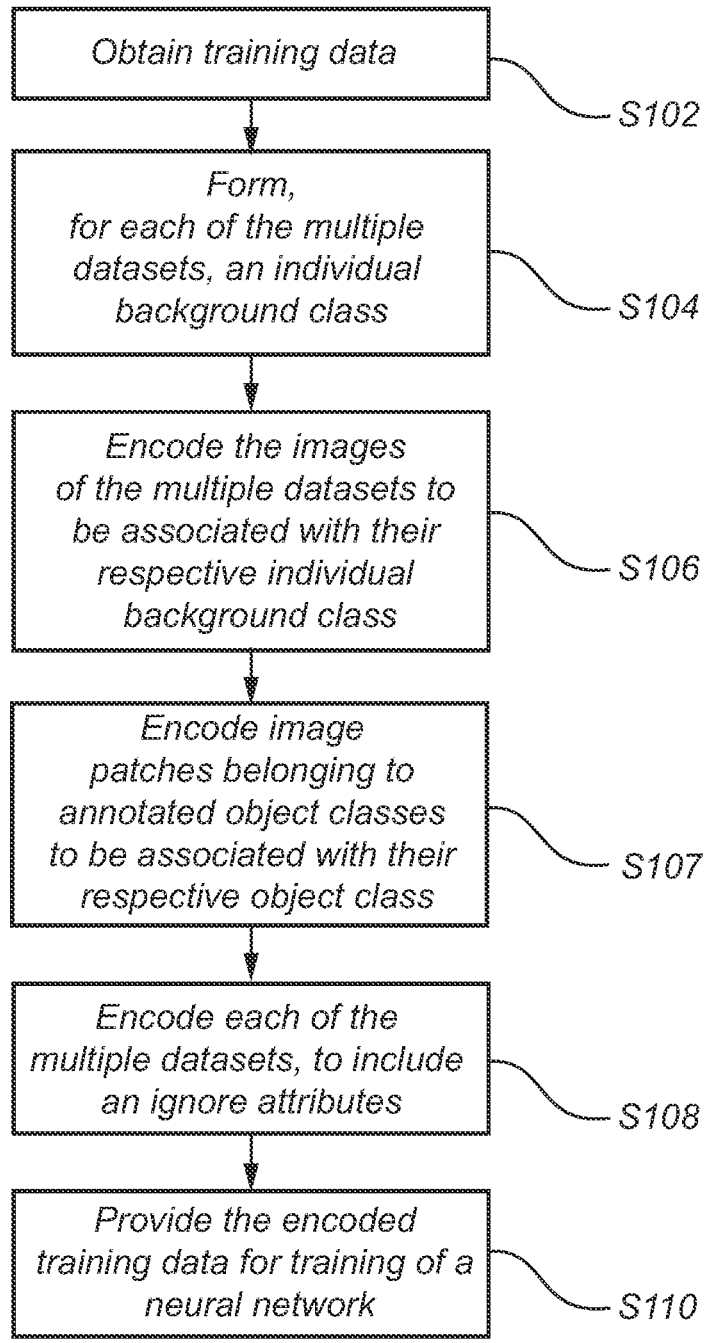
FIG. 3 is a flow-chart of method steps according to embodiments.
Figure 4:
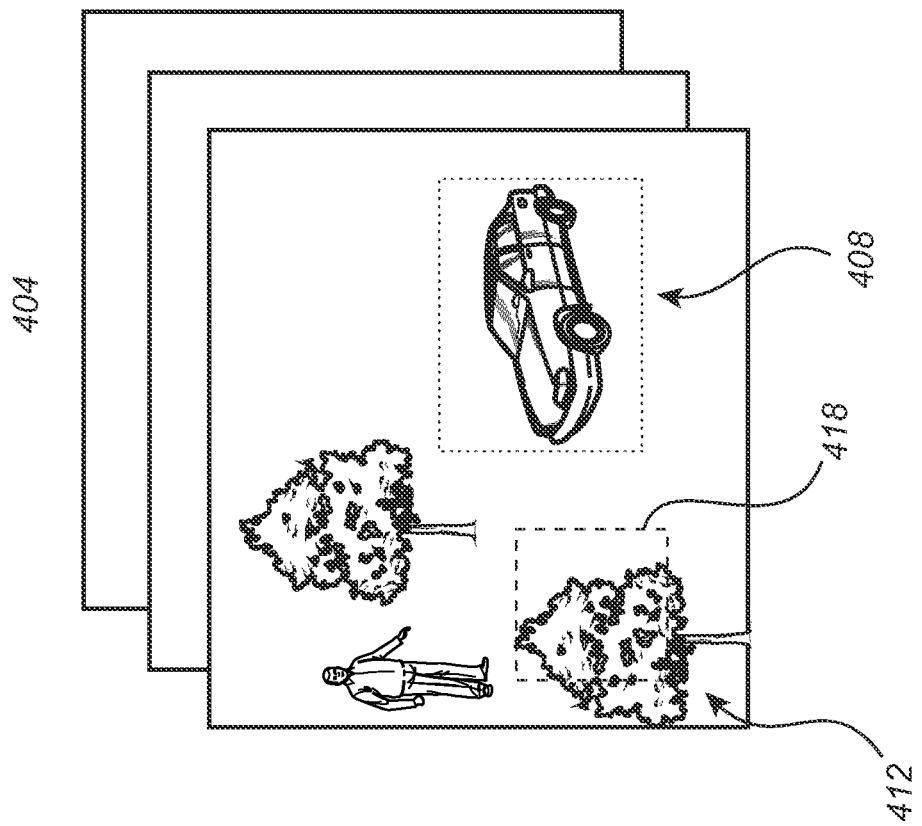
FIG. 4 conceptually illustrates two different datasets with samples belonging to different object classes and background classes according to embodiments.
Figure 4:
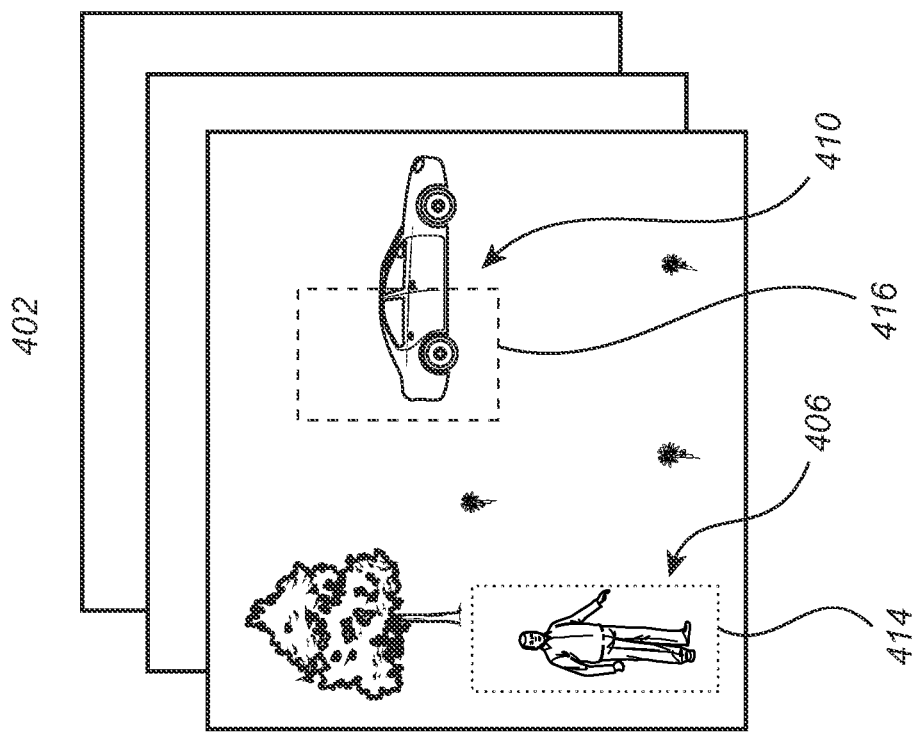

FIG. 3 is a flow-chart of method steps according to an embodiment and FIG. 4 conceptually illustrates two different datasets with samples belonging to different object classes and background classes. The steps of the method will not be discussed in conjunction with FIG. 4.

The method being for encoding training data for training of a neural network 200.

In step S102, training data including multiple datasets where each dataset comprises images annotated with at least one respective object class and where a number of background classes is less than the number of datasets. Preferably the number of background classes is one in the obtained training data.

FIG. 4 conceptually illustrates two datasets 402 and 404 each including multiple images. In dataset 402 only persons are annotated, e.g., object samples known to belong to the object class "person" are annotated, and in dataset 404 only samples belonging to the object class "car" are annotated. Other samples or image patches 410 and 412 belong to a background class in this input obtained training data. Table 1 shows the encoding of this example obtained input training data:

TABLE 1

| Datasets | Training Sample | Training sample region coordinates | | | | Background | Car | Person |
|---|---|---|---|---|---|---|---|---|
| | | x | y | w | h | | | |
| 402 | 406 | $x_1$ | $y_1$ | $w_1$ | $h_1$ | 0 | ignore | 1 |
| | 410 | $x_2$ | $y_2$ | $w_2$ | $h_2$ | 1 | ignore | 0 |
| 404 | 412 | $x_3$ | $y_3$ | $w_3$ | $h_3$ | 1 | 0 | ignore |
| | 408 | $x_4$ | $y_4$ | $w_4$ | $h_4$ | 0 | 1 | ignore |

Sample 410 is here considered background in dataset 402 despite it including a car which are considered positive samples in dataset 404 for training on object classification for the class "car". When a neural network is trained in this training data, it will consider the car in sample 410 of dataset 402 to be background which will hamper the overall training for detecting cars. The following steps are intended to alleviate this problem.

Step S104 includes forming, for each of the multiple datasets 402, 404, an individual background class associated with the at least one respective object class annotated in each of the multiple datasets 402, 404. Thus, for a given dataset a dedicated background class is formed.

The images of the multiple datasets 402 and 404 are encoded to be associated with their respective individual background class in step S106. Preferably, a single respective background class is assigned to each of the multiple datasets, preferably resulting in encoding the number of individual background classes to be equal to the number of datasets. With regards to background classes, the above Table 1, is reconfigured in the encoding to the following Table 2:

TABLE 2

| Datasets | Training Sample | Training sample region coordinates | | | | Background B1 | Background B2 | Car | Person |
|---|---|---|---|---|---|---|---|---|---|
| | | x | y | w | h | | | | |
| 402 | 406 | $x_1$ | $y_1$ | $w_1$ | $h_1$ | 0 | ignore | ignore | 1 |
| | 410 | $x_2$ | $y_2$ | $w_2$ | $h_2$ | 1 | ignore | ignore | 0 |
| 404 | 412 | $x_3$ | $y_3$ | $w_3$ | $h_3$ | ignore | 1 | 0 | ignore |
| | 408 | $x_4$ | $y_4$ | $w_4$ | $h_4$ | ignore | 0 | 1 | ignore |

In Table 2, there are two background classes, B1 and B2, one for each dataset. Further, in step S107, image patches belonging to annotated object classes in the images of the multiple datasets are encoded to be associated with their respective object class. In Tables 1 and 2, a sample indicated as "1" is an annotated sample considered a positive sample for the specific dataset. For example, in dataset 402, the annotated sample 406 is known to be a person and is therefore given a "1" in the table. Similarly, "0" is assigned to negative samples known to not be of the annotated class. For example, sample 406 is known to not be of the background class B1 associated with the object class to which the annotated sample 406 belongs to. In a similar manner, in dataset 402, the sample 410 is known to not be a person, since sample 410 is not in the region coordinates of the annotated sample 406 and is therefore given a "0" under "person" in the Table 2. Since sample 410 is not in the coordinate region of the annotated sample 406 it is considered to belong to background class B1 and is assigned "1" for background class B1.

With further reference to Table 2 and FIG. 4, the samples 406, 408, 410, and 412 are identified by region coordinates, x, y, of a bounding box with width w and height h, here an example bounding box 414 encloses a training sample 406 in an image. A sample may thus refer to an image patch. Here only one bounding box 414 is indicated. In other words, a training sample refer to the object class and to the coordinates of an image patch or bounding box 414 where an object of the specific object class can be found. With this realization, encoding the images also comprises assigning the individual background classes B1 and B2 to images patches 416 and 418 of the respective ones of the multiple datasets 402 and 404, the image patches 416 and 418 not including annotated objects. A background class thus refer to the image patches not associated with the annotated object in that dataset.

Encoding in step S106 may more specifically include encoding patches from the images that do not contain annotated objects or samples to be associated with their respective individual background class. This is similar to the above discussed step S107 where image patches belonging to annotated object classes in the images of the multiple datasets are encoded to be associated with their respective object class.

Further, each of the multiple datasets 402 and 404 are encoded in step S108, to include an ignore attribute ("ignore") to object classes that are annotated only in the other datasets of the multiple datasets 402 and 404. In Table 2, the object class "car" is assigned an ignore attribute in dataset 402 since it is annotated only in the other dataset 404, and the object class "person" is assigned an ignore attribute in dataset 404 since it is annotated only the other dataset 402. In addition, for each of the multiple datasets 402 and 404, an ignore attribute is assigned to background classes formed for the other datasets of the multiple datasets. For example, in data set 402, the background class B2 is assigned an ignore attribute since B2 is formed for the other dataset 404, and in dataset 404, the background class B1 is assigned an ignore attribute since B1 is formed for the other dataset 402.

The ignore attribute indicates that the assigned object class and background classes should not contribute to adapting the neural network in training using the respective dataset.

Finally, the encoded training data is provided for training of a neural network in step S110. Preferably, the encoded training data is only being used during training and is afterwards discarded. Thus, the encoded training data is generated, immediately used for training, and then discarded. The trained weights of the neural network resulting from the training are stored in a memory storage device.

The ignore attributes are assigned to images patches of the datasets including object classes or background classes to be ignored. For example, in relation to the dataset 402, the image patches defined by bounding boxes 414 and 416 related to samples 406 and 410 are assigned with "ignore" for the object class "car" or background class B2, both belonging to the other dataset 404.

Object samples assigned with "ignore" may not be used for training of the neural network. In this ways, ambiguous object samples are ignored so that they are not incorrectly interpreted as image background.

Object samples with the "ignore" attribute are not included in training of the neural network, neither as positive samples, i.e., annotated object samples, nor as negative samples considered to belong to the image background.

As an example, if the neural network employs so-called anchor boxes and detects an object with attribute "ignore", then the neural network is instructed to not learn from the corresponding region of the image, i.e., the weights or parameters of the neural network will not change based on detections in these regions. More specifically, the ignore attribute is configured to cause weights of the neural network to not be adjusted for object classes or background classes with the ignore attribute.

The methodology of using ignore attributes is now briefly explained.

Figure 5:
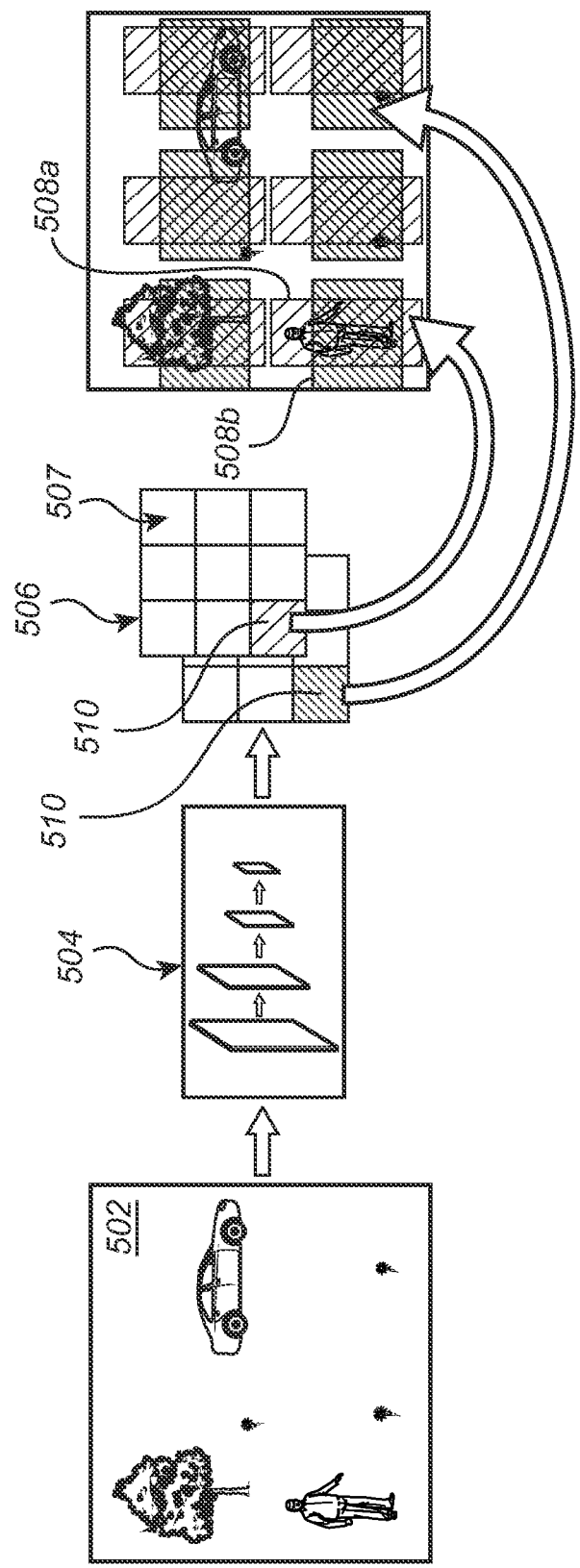
FIG. 5 conceptually illustrates the use of ignore attributes according to embodiments.

A single stage object detection algorithm generally divides an input image into grids that be used for detecting the objects. FIG. 5 conceptually illustrates how a convolutional neural network backbone 504 has divided the input image 502 into 3×3 grids 506. Detecting objects using a neural network may be considered predicting the class and location of an object within a grid cell 507.

Each grid cell 507 can be assigned with multiple so-called anchor boxes 508a-b. For avoiding cluttering the drawings, only anchor boxes 508a-b associated with cell 510 are denoted. Anchor boxes are a set of predefined bounding boxes of a certain height and width. These boxes 508a-b are defined to capture the scale and aspect ratio of specific object classes and are typically chosen based on object sizes in the training datasets. In this example, two anchor boxes 508a-b are defined and assigned to grid cell 510. The anchor boxes may here in this example be used for person and car detection.

During a prediction, the neural network 504 predicts the probability, so-called intersection over union, IoU, and offsets of each anchor box. If no object is present, it is considered a background class and the location is ignored. The step of using "ignore" includes creating multiple anchor boxes, typically thousands of anchor boxes. For each anchor box, calculate the IoU with the object's ground truth bounding boxes. The ground truth being provided by the encoding described herein such as represented in Table 2, and Table 3 below.

If the highest IoU is greater than a defined threshold, e.g., 50%, then the neural network detects the object and calculates a loss in its learning loss function. The neural network learns to predict the object. Otherwise, the anchor box may belong to a background class that the neural network and there are no objects.

If the object in the anchor box is assigned with an ignore attribute, the neural network does not learn from this region. Thus, if the anchor box overlaps with this region, an IoU value can be calculated. Even if the IoU is above a certain threshold, the loss will be assigned to zero, and no learning will be performed in neural network training. The weights of the network will not change with detections in these regions having assigned "ignore" attributes.

Figure 6:
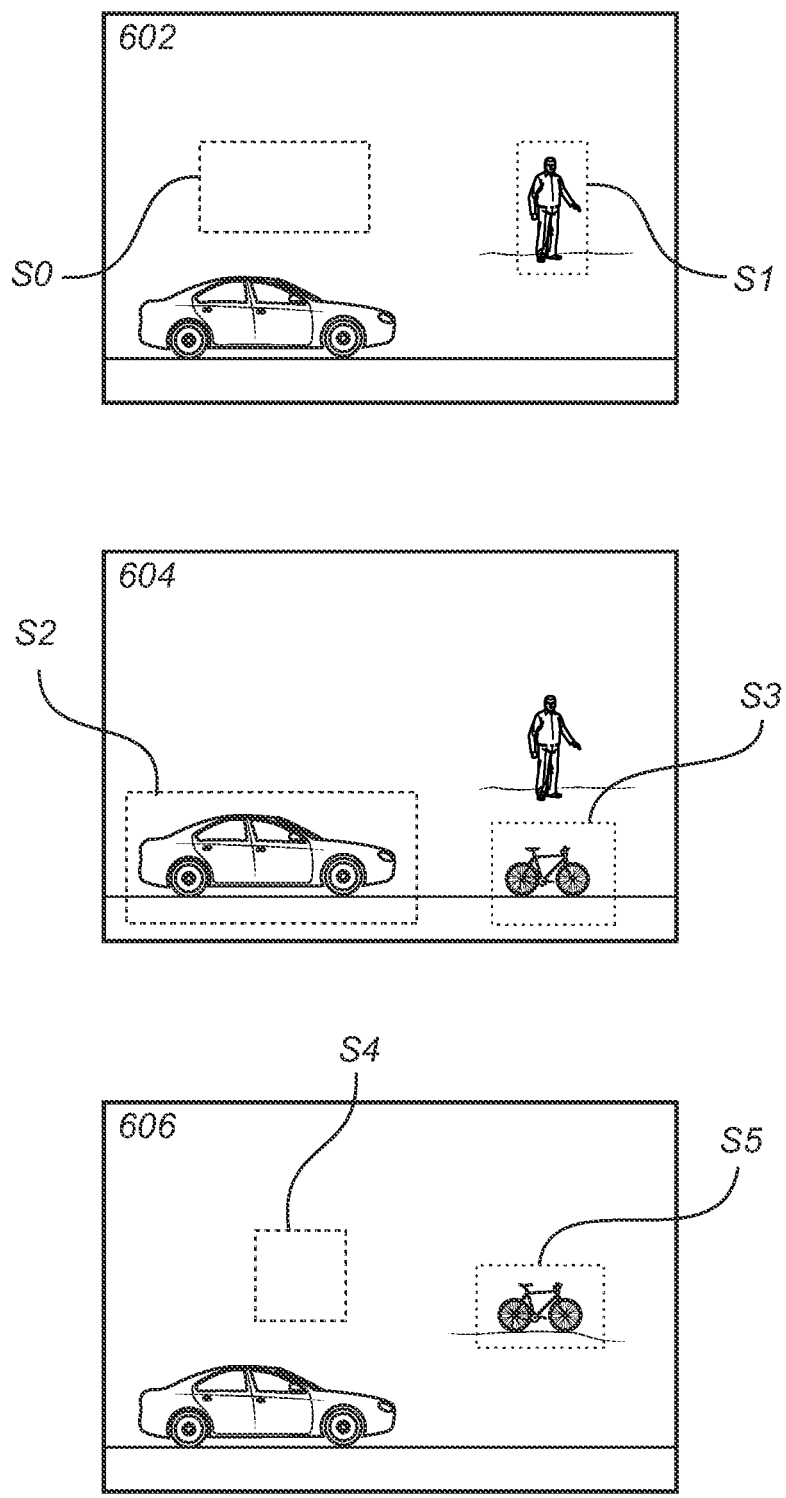
FIG. 6 conceptually illustrates three different datasets with samples belonging to different object classes and background classes according to embodiments.

It should be understood that the encoding method is applicable to any number of datasets. FIG. 4 conceptually illustrates two datasets, and as a further example FIG. 6 conceptually illustrates three datasets 602, 604, 606 and their encoding is represented in the below Table 3.

In dataset 602, samples belonging to object classes "car" and "person" are annotated and the associated background class is B0. Sample S0 which does not include any of the annotated samples is considered to belong to the associated background B0 and is therefore provided a "1" in the below table 3 for "B0" in dataset 602. The other two background classes B1, B2 which are formed for the other datasets 604 and 606 are provided with the ignore attribute for both samples S0 and S1 in dataset 602. Further, the object classes "car" and "person" are provided a "0" to indicate sample S0 as a negative sample for those object classes in dataset 602. The dataset 602 does not include annotated samples for object class "bike", which is therefore provided an ignore attribute in dataset 602. Sample S1 is annotated as object class "person", whereby the "1" in the below table 3 is provided to indicate it as positive sample for the object class "person". Both object class "car" and background class B0 is provided a "0" for sample S1 to indicate them as negative samples for those classes.

In dataset 604, samples belonging to object classes "person" and "bike" are annotated and the associated background class is B1. Sample S2 which does not include any of the annotated samples, i.e., including a bike or a person, is considered to belong to the associated background B1 and is therefore provided a "1" in the below table for dataset 604. The other two background classes B0, B2 which are formed for the other datasets 602 and 606 are provided the ignore attributes for all samples S2 and S3 in dataset 604. Further, the object classes "person" and "bike" are provided a "0" to indicate sample S2 as a negative sample for those object classes. The dataset 604 does not include annotated samples for object class "car", which object class is therefore provided an ignore attribute in dataset 604 for all samples. Sample S3 is annotated as object class "bike", whereby the "1" in the below table 3 is provided to indicate it as positive sample for object class "bike". Both object class "person" and background class B1 is provided a "0" for sample S3 to indicate them as negative samples for both object class "person" and background class B1.

In dataset 606, samples belonging to object classes "car" and "bike" are annotated and the associated background class is B2. Sample S4 which does not include any of the annotated samples, i.e., including a bike or a car, is considered to belong to the associated background B2 and is therefore provided a "1" in the below table for dataset 604.

The other two background classes B1, B2 which are formed for the other datasets 602 and 604 are provided the ignore attribute for both example samples S4 and S5 in dataset 604. In fact, the other two background classes B1, B2 will be provided an ignore sample for all samples of dataset 606. Further, the annotated object classes "car" and "bike" are provided a "0" to indicate sample S4 as a negative sample for those object classes. The dataset 606 does not include annotated samples for object class "person", which object class is therefore provided an ignore attribute in dataset 606 for all samples. Sample S5 is annotated as object class "bike", whereby the "1" in the below table 3 is provided to indicate sample S5 as positive sample for object class "bike". Both object class "person" and background class B2 is provided a "0" for sample S5 to indicate them as negative samples for both object class "person" and background class B2.

Generally, positive samples and negative samples are included when training a neural network, whereas ignore samples are not included.

TABLE 3

| Dataset | Training Sample S (dataset index, Class index) | Background classes index | | | Object Classes (foreground classes) | | |
|---|---|---|---|---|---|---|---|
| | | B0 | B1 | B2 | Car C1 | Person C2 | Bike C3 |
| 602 | S0 (0, 0) | 1 | ig | ig | 0 | 0 | ig |
| 602 | S1 (0, 2) | 0 | ig | ig | 0 | 1 | ig |
| 604 | S2 (1, 0) | ig | 1 | ig | ig | 0 | 0 |
| 604 | S3 (1, 3) | ig | 0 | ig | ig | 0 | 1 |
| 606 | S4 (2, 0) | ig | ig | 1 | 0 | ig | 0 |
| 606 | S5 (2, 3) | ig | ig | 0 | 0 | ig | 1 |

The method may further comprise, forming, for each of the multiple datasets 402, 404, further object classes that are not annotated in the respective dataset but that are annotated in at least one of the other datasets. This is advantageously used in case the encoding of the originally obtained training data is not encoded with all object classes for each of the datasets. the step of encoding then comprises providing an ignore attribute to the further object classes, as discussed above.

Figure 7:
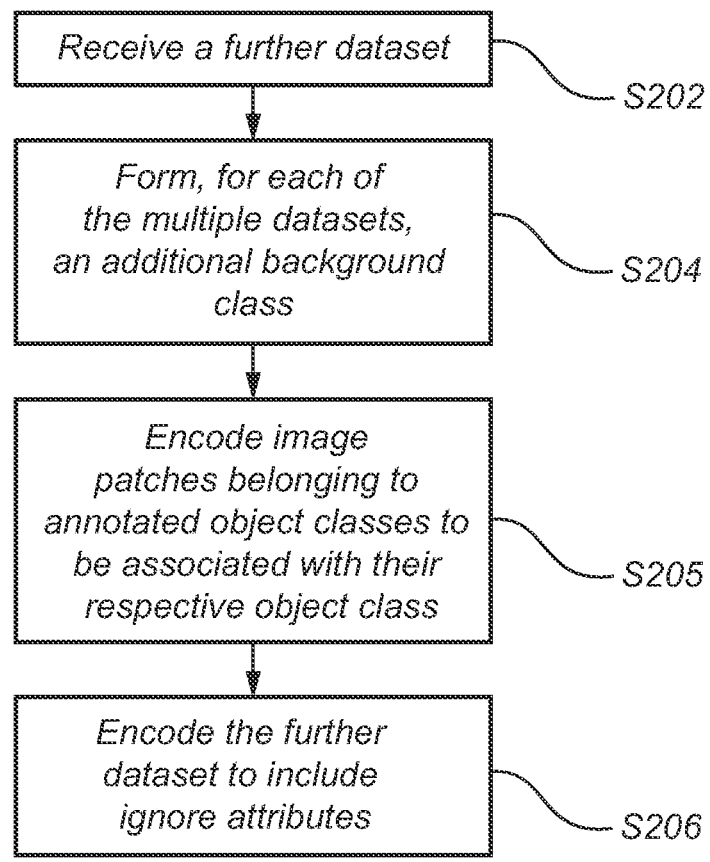
FIG. 7 is a flow-chart of method steps according to embodiments.

FIG. 7 is a flow-chart of further method steps according to embodiments of the present disclosure. During encoding of a newly obtained dataset, a further dataset may be desirable to include. Accordingly, in step S202, a further dataset comprising images annotated with at least one additional object class is received.

In order to include this further dataset in the encoding an additional background class is formed for each of the multiple datasets in step S204. The additional background class is associated with the at least one additional object class annotated in the further dataset. This forming step is analogous to the forming step S104 discussed in relation to FIG. 3.

Further, step S205 included encoding image patches belonging to annotated object classes in the images of the multiple datasets and the further data set to be associated with their respective object class. This encoding step is analogous to the encoding step S107 discussed in relation to FIG. 3.

Next, the further dataset is encoded to include an ignore attribute to object classes that are annotated only in the other ones of the multiple datasets and to background classes associated with the other ones of the multiple datasets in step S206. This encoding is similar to the above discussions above regarding assigning ignore attributes.

Figure 8:
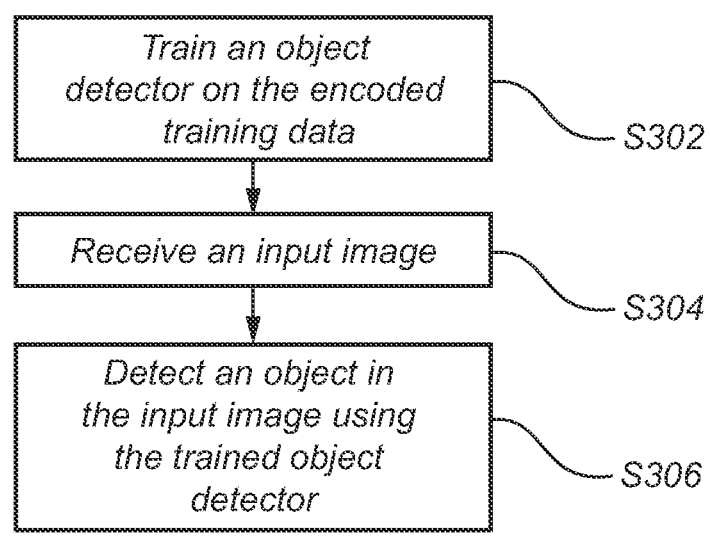
FIG. 8 is a flow-chart of method steps according to embodiments.

FIG. 8 is a flow-chart of further method steps according to embodiments of the present disclosure. Once the obtained training data has been encoded according to embodiments discussed herein, an object detector employing a neural network may be trained using the encoded training data. For example, the control unit 101 discussed in relation to FIG. 1 may employ a neural network 207 discussed in relation to FIG. 2A. It should be understood that the control unit 101 employing the neural network 207 may equally well be part of a cloud-based service and be located on a server remote from the image acquisition device 100.

In step S302, an object detector including a neural network 207 is trained on the encoded training data with the object classes, background classes, and ignore attributes according to the herein disclosed encoding methods as ground truth. In other words, the neural network is taught according to for example Tables 2 and 3 if using the respective encoded training data.

In step S304, the object detector receives an input image 201. For example, the camera 100 may have acquired an image of the scene 1, and this image is forwarded to the object detector.

Subsequently, the object detector detects an object, e.g., car 105*f* or 104*a* in the input image using the trained object detector.

Preferably, the object detector is trained on the multiple datasets of the encoded training data in a way where the training samples between different data sets are mixed which provides for more efficient use of multiple training data which allows for more convenient formulation of the training.

Figure 9:
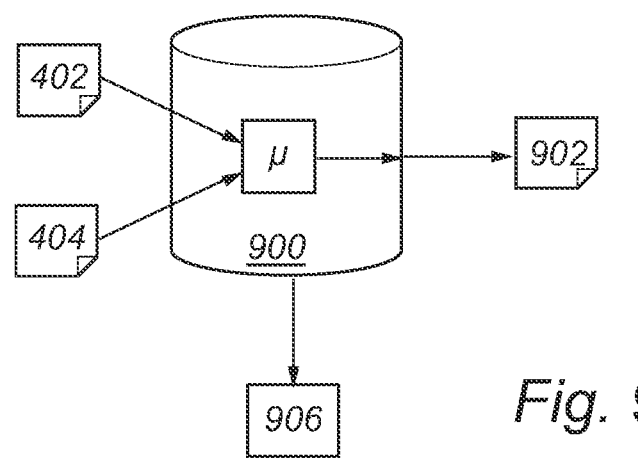
FIG. 9 conceptually illustrates a control unit that is configured to encode training data according to embodiments.

FIG. 9 conceptually illustrates a control unit 900 that is configured to encode training data according to anyone of the herein described embodiments. More specifically, the control unit 900 is configured to perform the steps of the method according to FIGS. 3, 7, and 8, and variants thereof discussed herein, generally indicated as process μ.

With reference to FIGS. 4 and 9, the control unit is configured to obtain training data including multiple datasets 402, 404 where each dataset comprises images annotated with at least one respective object class 406, 408 and where a number of background classes is less than the number of datasets, preferably the number of background classes is one.

The control unit 900 is configured to form, for each of the multiple datasets 402, 404, an individual background class B1, B2 associated with the at least one respective object class ("car", "person") annotated in the multiple datasets 402, 404.

The control unit 900 is further configured to encode the images of the multiple datasets 402, 404 to be associated with their respective individual background class, B1 and B2.

The control unit 900 is further configured to encode image patches belonging to annotated object classes in the images of the multiple datasets 402, 404 to be associated with their respective object class.

The control unit 900 is further configured to encode each of the multiple datasets 402, 404, to include an ignore attribute ("ignore") to object classes that are annotated only in the other datasets of the multiple datasets and to background classes (108) formed for the other datasets of the multiple datasets. As discussed above, the ignore attribute indicating that the assigned object class and background classes do not contribute to adapting the neural network in training using the respective dataset.

Finally, the control unit 900 is configured to provide the encoded training data 902 for training of a neural network. The control unit 900 may be configured to use the encoded training data 902 for training of a neural network. The weights of the trained neural network may be stored on a memory storage device 906 and the encoded training data 902 is discarded.

The control unit 900 illustrated and discussed in relation to FIG. 9 may be specifically used for encoding training data used for the training of the neural network 200. Thus, the control unit 900 provides the encoded training data for training of the neural network 200 elsewhere. The control unit 900 may also be configured to execute the training of the neural network 200. Further, the control unit 900 may equally well be the same control unit as the control unit 101 discussed in relation to FIG. 1, thus the control unit operative to run the trained neural network according to a use case. In other possible implementations, the neural network model 207 is loaded to a memory accessible to the control unit 101 after training.

The neural network discussed herein may be a deep neural network such as for example a CNN, although other deep neural networks may be applicable. CNNs are particularly suited for object detection and classification from images.

The control unit includes a microprocessor, microcontrol unit, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontrol unit or programmable digital signal processor mentioned above, the processor may further include computer executable code that controls operation of the programmable device.

The control functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general-purpose computer, special purpose computer, or special purpose processing machines to perform a certain function or group of functions.

Although the figures may show a sequence the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. Additionally, even though the disclosure has been described with reference to specific exemplifying embodiments thereof, many different alterations, modifications and the like will become apparent for those skilled in the art.

In addition, variations to the disclosed embodiments can be understood and effected by the skilled addressee in practicing the claimed disclosure, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A method for encoding training data for training of a neural network, the method comprising:
    obtaining training data including multiple datasets where each dataset comprises images annotated with at least one respective object class and where a number of background classes is less than the number of datasets;
    forming, for each of the multiple datasets, an individual background class associated with the at least one respective object class annotated in each of the multiple datasets;
    encoding the images of the multiple datasets to be associated with their respective individual background class;
    encoding image patches belonging to annotated object classes in the images of the multiple datasets to be associated with their respective object class;
    encoding each of the multiple datasets, to include an ignore attribute to object classes that are annotated only in the other datasets of the multiple datasets and to background classes formed for the other datasets of the multiple datasets, the ignore attribute indicating that the assigned object class and background classes do not contribute to adapting the neural network in training using the respective dataset; and
    providing the encoded training data for training of a neural network.

2. The method according to claim 1, wherein a single respective individual background class is formed for each of the multiple datasets.

3. The method according to claim 1, wherein encoding the images comprises assigning the individual background classes to images patches of the respective ones of the multiple datasets.

4. The method according to claim 1, further comprising:
    forming, for each of the multiple datasets, further object classes that are not annotated in the respective dataset but that are annotated in at least one of the other datasets.

5. The method according to claim 4, wherein the step of encoding comprises:
    providing an ignore attribute to the further object classes.

6. The method according to claim 1, further comprising:
receiving a further dataset comprising images annotated with at least one additional object class;
forming, for each of the multiple datasets, an additional background class associated with the additional object class annotated in the further dataset;
encoding image patches belonging to annotated object classes in the images of the multiple datasets and the further data set to be associated with their respective object class; and
encoding the further dataset to include an ignore attribute to object classes that are annotated only in the other ones of the multiple datasets and to background classes associated with the other ones of the multiple datasets.

7. The method according to claim 1, wherein forming the individual background classes is performed so that the number of individual background classes is equal to the number of datasets.

8. The method according to claim 1, further comprising assigning the ignore attributes to images patches of the datasets including object classes or background classes to be ignored.

9. The method according to claim 1, wherein the ignore attribute is configured to cause weights of the neural network to not be adjusted for object classes or background classes with the ignore attribute.

10. A method for object detection in an image frame, the method comprising:
training an object detector on the training data encoded with the object classes, background classes, and ignore attributes according to claim 1 as ground truth;
receiving an input image;
detecting an object in the input image using the trained object detector.

11. The method according to claim 10, wherein the step of training comprises training the object detector on the multiple datasets of the encoded training data simultaneously.

12. A control unit comprising circuitry configured to perform a method for encoding training data for training of a neural network, the method comprising:
obtaining training data including multiple datasets where each dataset comprises images annotated with at least one respective object class and where a number of background classes is less than the number of datasets;
forming, for each of the multiple datasets, an individual background class associated with the at least one respective object class annotated in each of the multiple datasets;
encoding the images of the multiple datasets to be associated with their respective individual background class;
encoding image patches belonging to annotated object classes in the images of the multiple datasets to be associated with their respective object class;
encoding each of the multiple datasets, to include an ignore attribute to object classes that are annotated only in the other datasets of the multiple datasets and to background classes formed for the other datasets of the multiple datasets, the ignore attribute indicating that the assigned object class and background classes do not contribute to adapting the neural network in training using the respective dataset; and
providing the encoded training data for training of a neural network.

13. The control unit according to claim 12, further comprising:
an image capturing device configured to capture a video stream.

14. The control unit according to claim 13, wherein the image capturing device is a video camera.

15. A non-transitory computer readable storage medium comprising a computer program comprising instructions which, when the program is executed by a computer, cause the computer to carry out a method for encoding training data for training of a neural network, the method comprising:
obtaining training data including multiple datasets where each dataset comprises images annotated with at least one respective object class and where a number of background classes is less than the number of datasets;
forming, for each of the multiple datasets, an individual background class associated with the at least one respective object class annotated in each of the multiple datasets;
encoding the images of the multiple datasets to be associated with their respective individual background class;
encoding image patches belonging to annotated object classes in the images of the multiple datasets to be associated with their respective object class;
encoding each of the multiple datasets, to include an ignore attribute to object classes that are annotated only in the other datasets of the multiple datasets and to background classes formed for the other datasets of the multiple datasets, the ignore attribute indicating that the assigned object class and background classes do not contribute to adapting the neural network in training using the respective dataset; and
providing the encoded training data for training of a neural network.

* * * * *